United States Patent
Nakajima et al.

(10) Patent No.: US 8,432,513 B2
(45) Date of Patent: Apr. 30, 2013

(54) LIQUID CRYSTAL DISPLAY DEVICE

(75) Inventors: Nobuhisa Nakajima, Osaka (JP); Tokumi Hayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 72 days.

(21) Appl. No.: 13/148,320

(22) PCT Filed: Feb. 9, 2010

(86) PCT No.: PCT/JP2010/000766
§ 371 (c)(1), (2), (4) Date: Aug. 8, 2011

(87) PCT Pub. No.: WO2010/092791
PCT Pub. Date: Aug. 19, 2010

(65) Prior Publication Data
US 2012/0002139 A1    Jan. 5, 2012

(30) Foreign Application Priority Data
Feb. 10, 2009    (JP) ................................ 2009-029131

(51) Int. Cl.
*G02F 1/1335* (2006.01)

(52) U.S. Cl.
USPC .......................................................... 349/65

(58) Field of Classification Search ...................... 349/65
See application file for complete search history.

(56) References Cited

U.S. PATENT DOCUMENTS

| | | | |
|---|---|---|---|
| 5,581,380 A | | 12/1996 | Bergman |
| 6,016,175 A | * | 1/2000 | Kim ................. 349/58 |
| 6,064,455 A | * | 5/2000 | Kim ................. 349/113 |
| 7,542,117 B2 | | 6/2009 | Murata et al. |
| 2004/0264211 A1 | * | 12/2004 | Han et al. ............... 362/561 |
| 2006/0055850 A1 | | 3/2006 | Murata et al. |
| 2009/0322983 A1 | | 12/2009 | Hashino |

FOREIGN PATENT DOCUMENTS

| | | |
|---|---|---|
| JP | 08-503792 A | 4/1996 |
| JP | 09-068700 A | 3/1997 |
| JP | 10-186361 A | 7/1998 |
| JP | 10-247413 A | 9/1998 |
| JP | 2001-166296 A | 6/2001 |
| JP | 2006-091443 A | 4/2006 |
| JP | 2007-280620 A | 10/2007 |

OTHER PUBLICATIONS

Official Communication issued in International Patent Application No. PCT/JP2010/000766, mailed on Apr. 6, 2010.
English translation of Official Communication issued in corresponding International Application PCT/JP2010/000766, mailed on Sep. 22, 2011.

* cited by examiner

*Primary Examiner* — Lucy Chien
(74) *Attorney, Agent, or Firm* — Keating & Bennett, LLP

(57) ABSTRACT

A liquid crystal display device according to the present invention (100) includes: a liquid crystal panel (200) having a front transparent substrate (210), a rear transparent substrate (220), and a liquid crystal layer (230) provided between the front transparent substrate (210) and the rear transparent substrate (220); a sidelight unit (300) mounted to the liquid crystal panel (200), the sidelight unit (300) including a light source (320) provided on a lateral side of the liquid crystal panel (200) and a light guide plate (330) provided between the liquid crystal panel and the light source; and a frame (310) to which the light source (320) and the light guide plate (330) are mounted.

20 Claims, 6 Drawing Sheets

LIQUID CRYSTAL DISPLAY DEVICE

TECHNICAL FIELD

The present invention relates to a liquid crystal display device having a sidelight unit.

BACKGROUND ART

Liquid crystal display devices are used not only for large-sized television sets but also as small-sized display devices in the display sections of mobile phones or the like, and there are needs for further thinner liquid crystal display devices in recent years. When a light source which is provided in a liquid crystal display device for achieving a high contrast ratio is disposed directly under the liquid crystal panel, the liquid crystal display device will become thick. Therefore, liquid crystal display devices have been proposed whose light source is provided on a lateral side of the liquid crystal panel (see, for example, Patent Documents 1 and 2).

Figure 6:
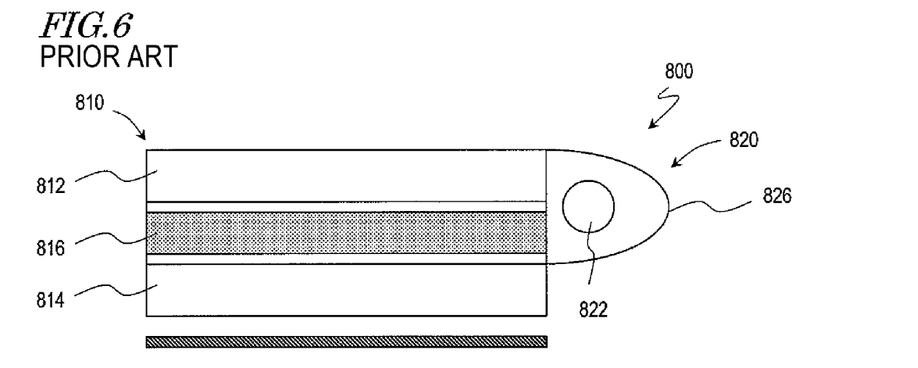
FIG. 6 A schematic diagram of a conventional liquid crystal display device.

FIG. 6 shows a schematic diagram of a liquid crystal display device 800 which is disclosed in Patent Document 1. The liquid crystal display device 800 includes a liquid crystal panel 810 and a sidelight unit 820 provided on a lateral side of the liquid crystal panel 810. Light which is emitted from a fluorescent lamp 822 in the sidelight unit 820 enters a glass substrate 812 of the liquid crystal panel 810, and displaying is performed by utilizing this light. A reflector 826 for enhancing the efficiency of utility of light emitted from the fluorescent lamp 822 is provided for the sidelight unit 820. Moreover, a light-scattering type liquid crystal layer 816 is provided for the liquid crystal panel 810 for an increased efficiency of utility of light in the liquid crystal display device 800, without requiring a polarizer.

Figure 7:
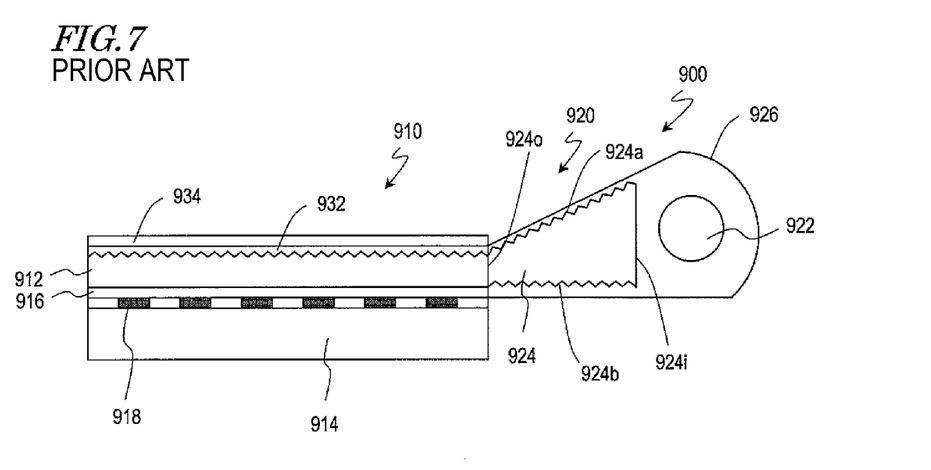
FIG. 7 A schematic diagram of another conventional liquid crystal display device.

FIG. 7 shows a schematic diagram of a liquid crystal display device 900 which is disclosed in Patent Document 2. The liquid crystal display device 900 includes a liquid crystal panel 910 and a sidelight unit 920 provided on a lateral side of the liquid crystal panel 910.

Light which is emitted from a fluorescent lamp 922 in the sidelight unit 920 propagates through a light guide plate 924 either directly or after being reflected by a reflector 926, and enters a glass substrate 912 of the liquid crystal panel 910. The liquid crystal panel 910 performs displaying by utilizing this light. The fluorescent lamp 922 is thicker than the glass substrate 912. A rear face 924b of the light guide plate 924 is parallel to the peak direction of the light which is emitted from the fluorescent lamp 922, whereas a front face 924a is provided so as to be inclined with respect to the rear face 924b, and an incident face 924i of the light guide plate 924 that opposes the fluorescent lamp 922 is thicker than an outgoing face 924o opposing the glass substrate 912. Therefore, light which is emitted from the fluorescent lamp 922 enters the thick incident face 924i of the light guide plate 924, and efficiently enters the glass substrate 912 via the thin outgoing face 924o. Moreover, protrusions are provided on the front face 924a and rear face 924b of the light guide plate 924, thus allowing light propagating through the light guide plate 924 to efficiently enter the glass substrate 912.

A film 932 provided on the glass substrate 912 of the liquid crystal panel 910 reflects light entering from the sidelight unit 920 in the lower direction. The light reflected from the film 932 passes through the liquid crystal layer 916, undergoes diffuse reflection at diffuse reflection electrodes 918, and again passes through the liquid crystal layer 916. Light modulation occurs in the liquid crystal layer 916. Thereafter, a polarizer 934 provided on the glass substrate 912 transmits light of a specific polarization component. In this manner, the liquid crystal display device 900 performs displaying.

CITATION LIST

Patent Literature

[Patent Document 1] Japanese Laid-Open Patent Publication No. 10-186361
[Patent Document 2] Japanese Laid-Open Patent Publication No. 2001-166296

SUMMARY OF INVENTION

Technical Problem

With the liquid crystal display device 800 of Patent Document 1, high-luminance displaying may not be achieved because light which is output from the sidelight unit 800 does not adequately enter the glass substrate 812. With the liquid crystal display device 900 of Patent Document 2, although the sidelight unit 920 is provided on a lateral side of the liquid crystal panel 910, a misalignment may occur between the fluorescent lamp 922, the light guide plate 924, and the glass substrate 912, in which case the light emitted from the fluorescent lamp 922 will not be effectively utilized.

The present invention has been made in view of the above problems, and an objective thereof is to provide a liquid crystal display device in which misalignment between a light source, a light guide plate, and a transparent substrate is reduced.

Solution to Problem

A liquid crystal display device according to the present invention comprises: a liquid crystal panel having a front transparent substrate, a rear transparent substrate, and a liquid crystal layer provided between the front transparent substrate and the rear transparent substrate; a sidelight unit mounted to the liquid crystal panel, the sidelight unit including a light source provided on a lateral side of the liquid crystal panel and a light guide plate provided between the liquid crystal panel and the light source; and a frame to which the light source and the light guide plate are mounted.

In one embodiment, the sidelight unit further includes the frame.

In one embodiment, the sidelight unit further has a stabilization sheet for at least fixing the frame and the liquid crystal panel.

In one embodiment, light emitted from the light source enters the front transparent substrate via the light guide plate.

In one embodiment, the liquid crystal layer is a light-scattering type.

In one embodiment, the stabilization sheet has a light-shielding function.

In one embodiment, the stabilization sheet is attached onto a portion of a front face of the liquid crystal panel and covers the light source and the light guide plate.

In one embodiment, the sidelight unit further includes a light-shielding sheet covering the light source and the light guide plate.

In one embodiment, the stabilization sheet is attached to a rear face of the liquid crystal panel.

In one embodiment, light emitted from the light source enters the rear transparent substrate via the light guide plate.

In one embodiment, the stabilization sheet has a reflection function.

In one embodiment, the sidelight unit further includes a flexible printed circuit having the light source provided thereon.

In one embodiment, an aperture is provided in each of the light guide plate and the frame; the light guide plate is mounted to one of a front face and a rear face of the frame so that the aperture of the light guide plate and the aperture of the frame overlap; and the flexible printed circuit is mounted to the other of the front face and rear face of the frame so that the light source is positioned in the aperture of the light guide plate and in the aperture of the frame.

In one embodiment, the light guide plate lowers directivity of light emitted from the light source.

In one embodiment, the light guide plate has a front face, a rear face, an incident face opposing the light source, and an outgoing face opposing the one transparent substrate.

In one embodiment, the incident face of the light guide plate is thicker than the outgoing face.

In one embodiment, the incident face of the light guide plate has a bump-dent structure provided at a position corresponding to the light source.

In one embodiment, a throughhole or a hole is provided in at least one of the front face and the rear face of the light guide plate.

In one embodiment, the outgoing face of the light guide plate has a bump-dent structure.

In one embodiment, at least one of the front face and the rear face of the light guide plate has a bump-dent structure.

In one embodiment, the front face of the light guide plate is substantially parallel to a peak direction of light emitted from the light source; and the rear face of the light guide plate is inclined with respect to the front face.

Advantageous Effects of Invention

According to the present invention, a liquid crystal display device in which misalignment between a light source, a light guide plate, and a transparent substrate is reduced can be provided.

BRIEF DESCRIPTION OF DRAWINGS

FIG. 1 (*a*) is a schematic upper plan view of a first embodiment of a liquid crystal display device according to the present invention; and (*b*) is a cross-sectional view of the liquid crystal display device.

FIGS. 2 (*a*) and (*b*) are schematic side views showing variants of the liquid crystal display device of the first embodiment; and (*c*) to (*e*) are schematic upper plan views showing light sources and light guide plates in variants of the liquid crystal display device of the first embodiment.

FIG. 3 (*a*) is a perspective view of a second embodiment of the liquid crystal display device according to the present invention; (*b*) is an exploded perspective view of the liquid crystal display device; (*c*) is an exploded perspective view of a sidelight unit of the liquid crystal display device; and (*d*) is a cross-sectional view of the liquid crystal display device.

FIG. 4 (*a*) is a perspective view of a third embodiment of the liquid crystal display device according to the present invention; (*b*) is an exploded perspective view of the liquid crystal display device; (*c*) is an exploded perspective view of a sidelight unit of the liquid crystal display device; and (*d*) is a cross-sectional view of the liquid crystal display device.

FIG. 5 (*a*) is a perspective view of a fourth embodiment of the liquid crystal display device according to the present invention; (*b*) is an exploded perspective view of the liquid crystal display device; (*c*) is an exploded perspective view of a sidelight unit of the liquid crystal display device; and (*d*) is a cross-sectional view of the liquid crystal display device.

DESCRIPTION OF EMBODIMENTS

Hereinafter, with reference to the drawings, embodiments of the liquid crystal display device according to the present invention will be described. However, the present invention is not limited to the following embodiments.

Embodiment 1

Figure 1:
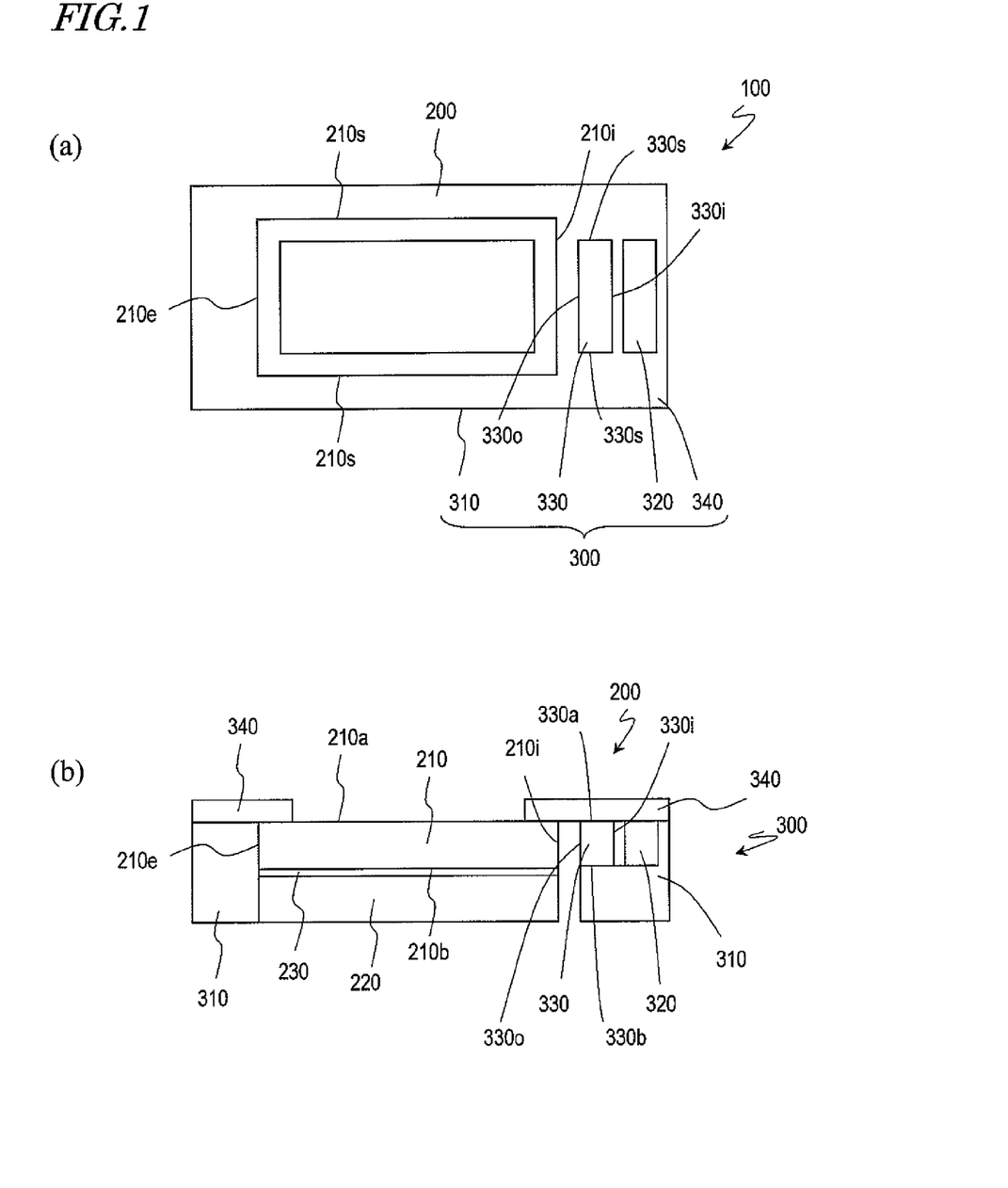

Hereinafter, a first embodiment of the liquid crystal display device according to the present invention will be described with reference to FIG. 1. FIG. 1(*a*) shows a schematic upper plan view of a liquid crystal display device 100 of the present embodiment, and FIG. 1(*b*) shows a schematic cross-sectional view of the liquid crystal display device 100.

The liquid crystal display device 100 includes a liquid crystal panel 200, and a sidelight unit 300 mounted to the liquid crystal panel 200. The liquid crystal panel 200 includes a front transparent substrate 210, a rear transparent substrate 220, and a liquid crystal layer 230 provided between the front transparent substrate 210 and the rear transparent substrate 220. Herein, the liquid crystal panel 200 is of the reflection mode. The front transparent substrate 210 and the rear transparent substrate 220 are made of glass, for example.

Although not shown, as necessary, electrodes, wiring lines, insulating layers and/or semiconductor layers are provided between the front transparent substrate 210 and the liquid crystal layer 230 and between the rear transparent substrate 220 and the liquid crystal layer 230. Similarly, although not shown, a reflective layer is provided on the rear transparent substrate 220 side of the liquid crystal layer 230; for example, the reflective layer may be provided between the rear transparent substrate 220 and the liquid crystal layer 230. For example, the front transparent substrate 210 is a part of an active matrix substrate, and the rear transparent substrate 220 is a part of a counter substrate. In the following description, the front transparent substrate 210 and the rear transparent substrate 220 may simply be referred to as the transparent substrate 210 and the transparent substrate 220, respectively.

Theسidelight unit 300 includes a frame 310, a light source 320, and a light guide plate 330. The frame 310 has a frame shape with an open center, with the liquid crystal panel 200 being disposed in the center of the frame 310. The light source 320 and the light guide plate 330 are mounted to the frame 310. In FIG. 1, the light source 320 and the light guide plate 330 are mounted on the front face of the frame 310. The light source 320 may be light-emitting diodes (Light Emitting Diodes: LEDs) or a fluorescent lamp.

The light guide plate 330 is formed through injection molding of polycarbonate, for example. Although its details will be described later, provision of the light guide plate 330 reduces unevenness in the luminance of the liquid crystal panel 200, and improves the efficiency of utility of light emitted from the light source 320.

In the liquid crystal display device 100, the sidelight unit 300 further includes a stabilization sheet 340. The stabilization sheet 340 has a frame shape with an open center, each of whose sides has a width which is greater than the width of the frame 310. In the sidelight unit 300, the stabilization sheet 340 is at least attached on the frame 310. In the liquid crystal display device 100 shown in FIG. 1, the stabilization sheet 340 is attached not only on the frame 310 but also on the light source 320 and the light guide plate 330. By mounting the sidelight unit 300 to the liquid crystal panel 200, the light source 320 of the sidelight unit 300 is disposed on a lateral side of the transparent substrate 210 of the liquid crystal panel 200 via the light guide plate 330, which allows the liquid crystal display device 100 to be thin. Through this mounting, the stabilization sheet 340 at least fixes the frame 310 and the liquid crystal panel 200. Light emitted from the light source 320 enters the transparent substrate 210 of the liquid crystal panel 200 via the light guide plate 330, and displaying is performed by utilizing this light. Thus, the light emitted from the light source 320 of the sidelight unit 300 enters the front transparent substrate 210 of the liquid crystal panel 200 via the light guide plate 330. As such, the sidelight unit 300 is referred to as a front-sidelight unit.

The light guide plate 330 has an incident face 330$i$ opposing the light source 320, an outgoing face 330$o$ opposing the front transparent substrate 210, a front face 330$a$ disposed on the front face side (the viewer's side), a rear face 330$b$, and two side faces 330$s$. Light emitted from the light source 320 enters at the incident face 330$i$ of the light guide plate 330, so as to propagate through the light guide plate 330. Much of the light propagating through the light guide plate 330 reaches the outgoing face 330$o$ without reaching the front face 330$a$, the rear face 330$b$, or the side faces 330$s$; however, within the light propagating through the light guide plate 330, a portion of the light reaching the front face 330$a$, the rear face 330$b$, or the side faces 330$s$ is reflected at the front face 330$a$, the rear face 330$b$, or the side faces 330$s$, while another portion thereof is transmitted therethrough. The light propagating through the light guide plate 330 and reaching the outgoing face 330$o$ is output from the outgoing face 330$o$ to the front transparent substrate 210 of the liquid crystal panel 200. Note that a light-shielding member is preferably provided on the front face 330$a$ of the light guide plate 330 in order to reduce light which is transmitted through the front face 330$a$ of the light guide plate 330 and reaches the viewer (so-called leakage light). For example, the stabilization sheet 340 may have a light-shielding function, and the stabilization sheet 340 may be attached not only on the liquid crystal panel 200 and the frame 310 but also on the light source 320 and the light guide plate 330 so as to cover the light source 320 and the light guide plate 330.

The front transparent substrate 210 has an incident face 210$i$ opposing the outgoing face 330$o$ of the light guide plate 330, a terminal end face 210$e$, a front face 210$a$, a rear face 210$b$, and side faces 210$s$. Similarly to the rear transparent substrate 220, the front transparent substrate 210 has a rectangular solid shape. Preferably, the front faces of the transparent substrate 210, the light source 320, and the light guide plate 330 are basically coplanar.

Preferably, the light emitted from the light source 320 has a certain level of directivity. In actuality, however, the light emitted from the light source 320 has a component traveling in a direction which slightly differs from a direction of travel that exhibits a luminance peak. In the following description, a direction of travel of the light emitted from the light source 320 that exhibits a luminance peak will be referred to as the peak direction. The light guide plate 330 and the front transparent substrate 210 are on the peak direction of the light emitted from the light source 320.

In the sidelight unit 300 of the liquid crystal display device 100, the light source 320 and the light guide plate 330 are mounted on the frame 310, whereby misalignment of the light source 320 and the light guide plate 330 is suppressed. In the case where the sidelight unit 300 as such is mounted on the liquid crystal panel 200, the stabilization sheet 340 fixes the liquid crystal panel 200 and the frame 310, so that the transparent substrate 210, the light source 320, and the light guide plate 330 can be disposed with a high precision, whereby decrease in the efficiency of utility of light emitted from the light source 320 can be suppressed.

The liquid crystal display device 100 is produced as follows.

First, the frame 310, the light source 320, the light guide plate 330, and the stabilization sheet 340 are provided. Thereafter, the light source 320 and the light guide plate 330 are mounted to the frame 310. Through this mounting, the incident face 330$i$ of the light guide plate 330 is disposed so as to oppose the light source 320. As for their order of mounting on the frame 310, either the light source 320 or the light guide plate 330 may be the first to be mounted.

Next, the stabilization sheet 340 is attached at least onto the frame 310. In this case, the stabilization sheet 340 has a region which does not overlap the frame 310. In this manner, the sidelight unit 300 is produced.

Next, the sidelight unit 300 is mounted to the liquid crystal panel 200. Through this mounting, the stabilization sheet 340 becomes attached to the liquid crystal panel 200, whereby the liquid crystal panel 200 and the frame 310 are fixed. In this manner, the liquid crystal display device 100 is produced.

In the above description, the liquid crystal panel 200 is of the reflection mode; the light source 320 and the light guide plate 330 are provided on a lateral side of the front transparent substrate 210; and light emitted from the light source 320 enters the front transparent substrate 210 via the light guide plate 330; however, the present invention is not limited thereto. The liquid crystal panel may be of the transmission mode or the transflective mode; the light source and the light guide plate may be provided on a lateral side of the rear transparent substrate; and light emitted from the light source may enter the rear transparent substrate via the light guide plate.

Moreover, in the liquid crystal display device 100 shown in FIG. 1, the light source 320 and the light guide plate 330 are mounted on the front face of the frame 310, and the stabilization sheet 340 is attached on the front faces of the liquid crystal panel 200 and the sidelight unit 300; however, the present invention is not limited thereto. The light source and the light guide plate may be mounted on the rear face of the frame, and the stabilization sheet may be attached on the rear faces of the liquid crystal panel and the sidelight unit.

Alternatively, for example, the light source 320 may be provided on a flexible printed circuit (FPC) and an aperture may be provided in each of the frame 310 and the light guide plate 330; and the light guide plate 330 may be mounted on one of the front face and rear face of the frame 310, while mounting the FPC on the other of the front face and rear face of the frame 310 so that the light source 320 is provided at a position where the apertures of the frame 310 and the light guide plate 330 overlap.

In the above description, the sidelight unit 300 includes the frame 310; however, the present invention is not limited thereto. The frame 310 may be provided separately from the sidelight unit 300. For example, the frame 310 may be provided integrally with the liquid crystal panel 200.

FIG. 1 illustrates the transparent substrate 210 as having a substantially equal thickness to the thickness of the light source 320; however, the transparent substrate may be thinner than the light source. In this case, in order to effectively utilize the light emitted from the light source, it is preferable that the incident face of the light guide plate is thicker than its outgoing face.

Figure 2:
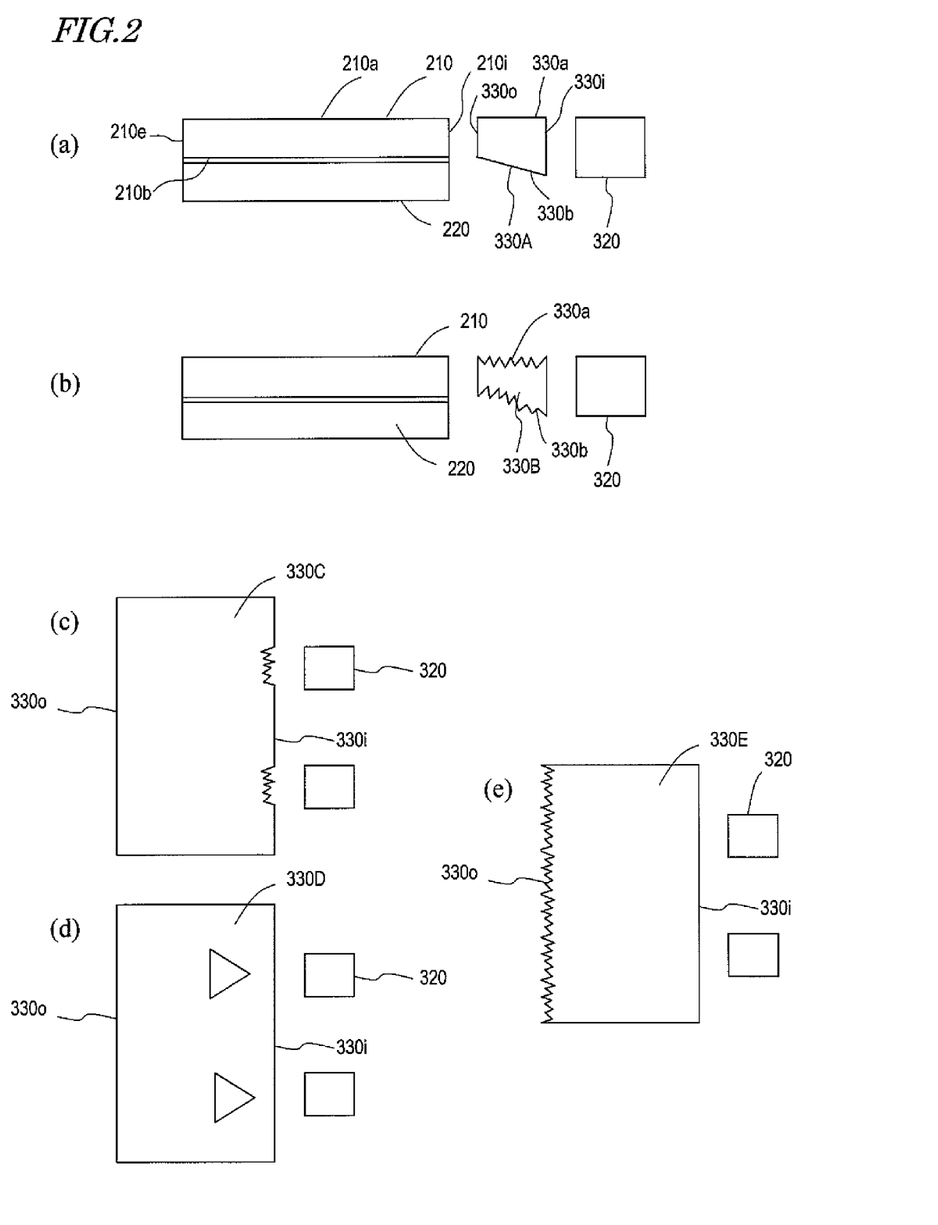

As shown in FIG. 2(a), in a light guide plate 330A, the incident face 330i opposing the light source 320 is thicker than the outgoing face 330o opposing the transparent substrate 210. Moreover, the front face 330a of the light guide plate 330A is basically parallel to the peak direction of light emitted from the light source 320, whereas the rear face 330b is tilted with respect to the front face 330a. Thus, the front face 330a of the light guide plate 330 is substantially parallel to the peak direction of light emitted from the light source 320, whereas the rear face 330b of the light guide plate 330 is provided so as to be inclined with respect to the peak direction of light emitted from the light source 320.

Since the transparent substrate 210 is thinner than the light source 320, the liquid crystal display device 100 can be made thin. It is further preferable that not only the transparent substrate 210 but also the transparent substrate 220 is thin. Moreover, by ensuring that the front faces of the transparent substrate 210, the light source 320, and the light guide plate 330A are coplanar, a thin liquid crystal display device 100 having a flat front face can be realized.

By providing the light guide plate 330A, it becomes possible to reduce unevenness in the luminance of the liquid crystal panel 200. If the light source 320 were provided on a lateral side of the front transparent substrate 210 without providing the light guide plate 330A, a component of the light emitted from the light source 320 that reached the incident face 210i side of the front face 210a and rear face 210b of the front transparent substrate 210 would enter at a relatively small angle with respect to the normal direction of the front face 210a and rear face 210b, so that the luminance at the incident face 210i side of the liquid crystal panel 200 would become relatively high. On the other hand, a component of the light emitted from the light source 320 that reached the terminal end face 210e of the front face 210a and rear face 210b of the front transparent substrate 210 would enter at a relatively large angle with respect to the normal direction of the front face 210a and rear face 210b, so that the luminance at the terminal end face 210e of the liquid crystal panel 200 would become relatively low. This would result in unevenness in luminance. On the other hand, by providing the light guide plate 330A between the light source 320 and the front transparent substrate 210, the distance between the light source 320 and the front transparent substrate 210 becomes long, whereby the difference between the angle at the incident face 210i side and the angle at the terminal end face 210e side of the front face 210a and rear face 210b of the front transparent substrate 210 is decreased, thus reducing unevenness in luminance.

Since the light guide plate 330A has the front face 330a being basically coplanar with the front face 210a of the transparent substrate 210 and the rear face 330b being inclined with respect to the front face 330a, leakage light which reaches the viewer without passing through the liquid crystal layer 230 can be reduced. Now, the light which is emitted from the light source 320 and which reaches the front face 330a and rear face 330b of the light guide plate 330A will be discussed. Light which is emitted from the light source 320 and which reaches the front face 330a of the light guide plate 330A enters at a relatively large angle with respect to the normal direction of the front face 330a, so that a relatively large component is reflected at the front face 330a of the light guide plate 330A, and the light which travels in the lower direction after being reflected enters the liquid crystal panel 200 and is modulated by the liquid crystal layer 230 as appropriate. On the other hand, light which is emitted from the light source 320 and which reaches the rear face 330b of the light guide plate 330A enters at a relatively small angle with respect to the normal direction of the rear face 330b, so that a relatively large component passes through the rear face 330b of the light guide plate 330A, and if at all it is reflected, the component which is parallel to the peak direction of the reflected light is reduced before reaching the front face 330a of the light guide plate 330A. Therefore, within the light emitted from the outgoing face 330o of the light guide plate 330A, the light having an upper-direction component is reduced, whereby the leakage light passing through the front transparent substrate 210 not via the liquid crystal layer 230 is restrained from reaching the viewer.

As shown in FIG. 2(a), the front face 330a and rear face 330b are planar in the light guide plate 330A; however, the present invention is not limited thereto. The front face and rear face of the light guide plate do not need to be planar.

As shown in FIG. 2(b), in a light guide plate 330B, bump-dent structures having dents and bumps extending along the width direction are provided on the front face 330a and rear face 330b. Thus, the component which is parallel to the peak direction of the light having been reflected at the bump-dent structures on the front face 330a and rear face 330b is increased relative to before the reflection, whereby leakage light can be reduced and the efficiency of utility of light can be improved. As a result, with the light guide plate 330B, the light from the light source 320 can be sufficiently utilized and the unevenness in luminance between the light source side and the terminal end side can be eliminated.

The light guide plates 330A and 330B reduce unevenness in luminance between the incident face 210i side and the terminal end face 210e side of the liquid crystal panel 200; however, the present invention is not limited thereto. In the case where the light source 320 is smaller in size than the incident face 330i of the light guide plate 330, e.g., relatively small-sized LEDs are to be used as the light source 320, it is preferable that the number of LEDs 320 is as small as possible from the standpoint of cost reduction. In this case, since the region in which the light emitted from the LEDs 320 enters the incident face 330i is smaller than the overall size of the incident face 330i, the light guide plate 330 may diffuse light, and the directivity of the light guide plate 330 along at least one of the thickness direction and the width direction may be lowered. Thus, by ensuring that the directivity of the light which is emitted from the outgoing face 330o is lower than the directivity of the light which has been emitted from the light source 320 but has not entered the incident face 330i of the light guide plate 330, the light guide plate 330 can reduce unevenness in luminance along the width direction of the liquid crystal panel 200 by averaging out the intensity of the light entering the transparent substrate 210, thus achieving downsizing and cost reduction.

As shown in FIG. 2(c), in a light guide plate 330C, bump-dent structures having bumps and dents extending along the thickness direction are provided at positions of the incident face 330i that correspond to the light sources 320. In this case, light is diffused along the width direction at the incident face 330i of the light guide plate 330.

As shown in FIG. 2(d), in a light guide plate 330D, throughholes penetrating from the front face 330a through to the rear face 330b are provided at positions in the middle of the light guide plate 330D that correspond to the light sources 320. Each throughhole is provided so as to be smaller at the incident face 330i but larger at the outgoing face 330o. As light emitted from a light source 320 reaches this throughhole, the light is diffused along the width direction. Instead of the throughholes penetrating from the front face 330a through to the rear face 330b, holes which do not penetrate the light guide plate 330 may be provided on the front face 330a or on the rear face 330b.

As shown in FIG. 2(e), in a light guide plate 330E, a bump-dent structure having dents and bumps extending along the thickness direction is provided on an outgoing face 330o thereof. In this case, light is diffused along the width direction at the outgoing face 330o of the light guide plate 330E. Thus, with the light guide plates 330C, 330D, and 330E, unevenness in luminance can be eliminated even when the distance between the transparent substrate and the light source is relatively short.

Although the light guide plates 330C, 330D, and 330E shown in FIG. 2(c), FIG. 2(d), and FIG. 2(e) individually adopt their constructions for diffusing light, the present invention is not limited thereto. These constructions may be combined as necessary. Alternatively, further as in the light guide plate 330A shown in FIG. 2(a), the light guide plate may have varying thickness; or as in the light guide plate 330B shown in FIG. 2(b), the light guide plate may have varying thickness together with bump-dent structures provided on the front face and rear face.

Embodiment 2

Hereinafter, with reference to FIG. 3, a second embodiment of the liquid crystal display device according to the present invention will be described. FIG. 3(a) shows a perspective view of a liquid crystal display device 100A of the present embodiment; FIG. 3(b) shows an exploded perspective view of the liquid crystal display device 100A; FIG. 3(c) shows an exploded perspective view of a sidelight unit 300A in the liquid crystal display device 100A; and FIG. 3(d) shows a schematic cross-sectional view of the liquid crystal display device 100A. For conciseness, any description similar to those of the liquid crystal display device 100 above will be omitted.

The liquid crystal display device 100A includes a liquid crystal panel 200 and the sidelight unit 300A. In the liquid crystal display device 100A, the sidelight unit 300A is mounted on the front face of the liquid crystal panel 200. In the liquid crystal display device 100A, too, light emitted from light sources 320 of the sidelight unit 300A enters a front transparent substrate 210 of the liquid crystal panel 200 via a light guide plate 330. The sidelight unit 300A is a front-sidelight unit.

In the liquid crystal display device 100A, the liquid crystal panel 200 is of the reflection mode. The front transparent substrate 210 and the rear transparent substrate 220 each have a thickness of e.g. 0.2 mm. For example, a liquid crystal layer 230 of the liquid crystal panel 200 is a light-scattering type. Although not shown, a reflective layer for causing specular reflection of incident light is provided between the liquid crystal layer 230 and the rear transparent substrate 220. This reflective layer is made of a metal, for example. When the voltage which is applied across the liquid crystal layer 230 is low, light is scattered by the liquid crystal layer 230, whereby white displaying is achieved. Conversely, when a predetermined voltage is applied across the liquid crystal layer 230, light undergoes specular reflection without being scattered at the liquid crystal layer 230, whereby black displaying is achieved. Thus, in the case where the liquid crystal layer 230 is a light-scattering type, the liquid crystal panel 200 may lack polarizers, and a sufficient luminance can be obtained even if the intensity of light emitted from the sidelight unit 300A is relatively low, whereby power consumption can be reduced.

The sidelight unit 300A includes a frame 310, light sources 320, a light guide plate 330, and a stabilization sheet 340. In the liquid crystal display device 100A, by mounting the sidelight unit 300A to the liquid crystal panel 200, the light sources 320 of the sidelight unit 300A are disposed on a lateral side of the front transparent substrate 210 of the liquid crystal panel 200 via the light guide plate 330.

The frame 310 has a frame shape with an open center, one of whose shorter sides is partly missing, and the inner periphery of the frame 310 is designed in a size substantially corresponding to the liquid crystal panel 200. The frame 310 is in contact with the light guide plate 330, and is preferably made of a highly reflective substance such as white polycarbonate (PC) resin. Or, ideally, it is preferable that the frame 310 is subjected to a metal treatment and then to an insulation treatment from above the resultant metal film, thus preventing leakage through contact with an electrically-conductive film on the rear transparent substrate 220. The outermost peripheral portion of the frame 310 protrudes toward the front face side. A linear aperture is provided along a longer side of the frame 310.

In the liquid crystal display device 100A, a plurality of LEDs are provided as the light sources 320. The LEDs 320 are provided on a flexible printed circuit (FPC) 322. The LEDs 320 are thicker than each of the front transparent substrate 210 and the rear transparent substrate 220, but are thinner than the liquid crystal panel 200. The thickness of the LEDs 320 is e.g. 0.4 mm.

The light guide plate 330 is a thin plate, with a plurality of rectangular apertures provided along one of its longer sides. The rectangular apertures in the light guide plate 330 have a size corresponding to the light sources 320. The size of the apertures in the light guide plate 330 is smaller than the size of the aperture in the frame 310. The apertures in the light guide plate 330 overlap with the aperture in the frame 310, and the light sources 320 on the FPC 322 are provided so as to correspond to the apertures in both of the frame 310 and the light guide plate 330.

The light guide plate 330 has incident faces 330i opposing the light sources 320, an outgoing face 330o opposing the front transparent substrate 210, a front face 330a disposed on the front face side, a rear face 330b, and side faces 330s. In the liquid crystal display device 100A, the face of each rectangular aperture in the light guide plate 330 that opposes a light source 320 is an incident face 330i.

The light guide plate 330 is composed of a flat portion 330t and a slope 330u that continues from the flat portion 330t. The flat portion 330t has a constant thickness, which may be e.g. 0.4 mm. Apertures are provided in the flat portion 330t, and the incident face 330i provided in a portion of each aperture has a thickness of 0.4 mm. The slope 330u has gradually varying thickness, and the outgoing face 330o provided at the end face of the slope 330u has a thickness of 0.2 mm. The light guide plate 330 becomes thinner as the light entering at the incident faces 330i of the light guide plate 330 travels toward the outgoing face 330o. Thus, the thickness of the light guide plate 330 differs from place to place. The light guide plate 330 is formed through injection molding of polycarbonate, using a predetermined die. The region of the frame 310 that corresponds to the slope 330u of the light guide plate 330 also has varying thickness.

Figure 3:
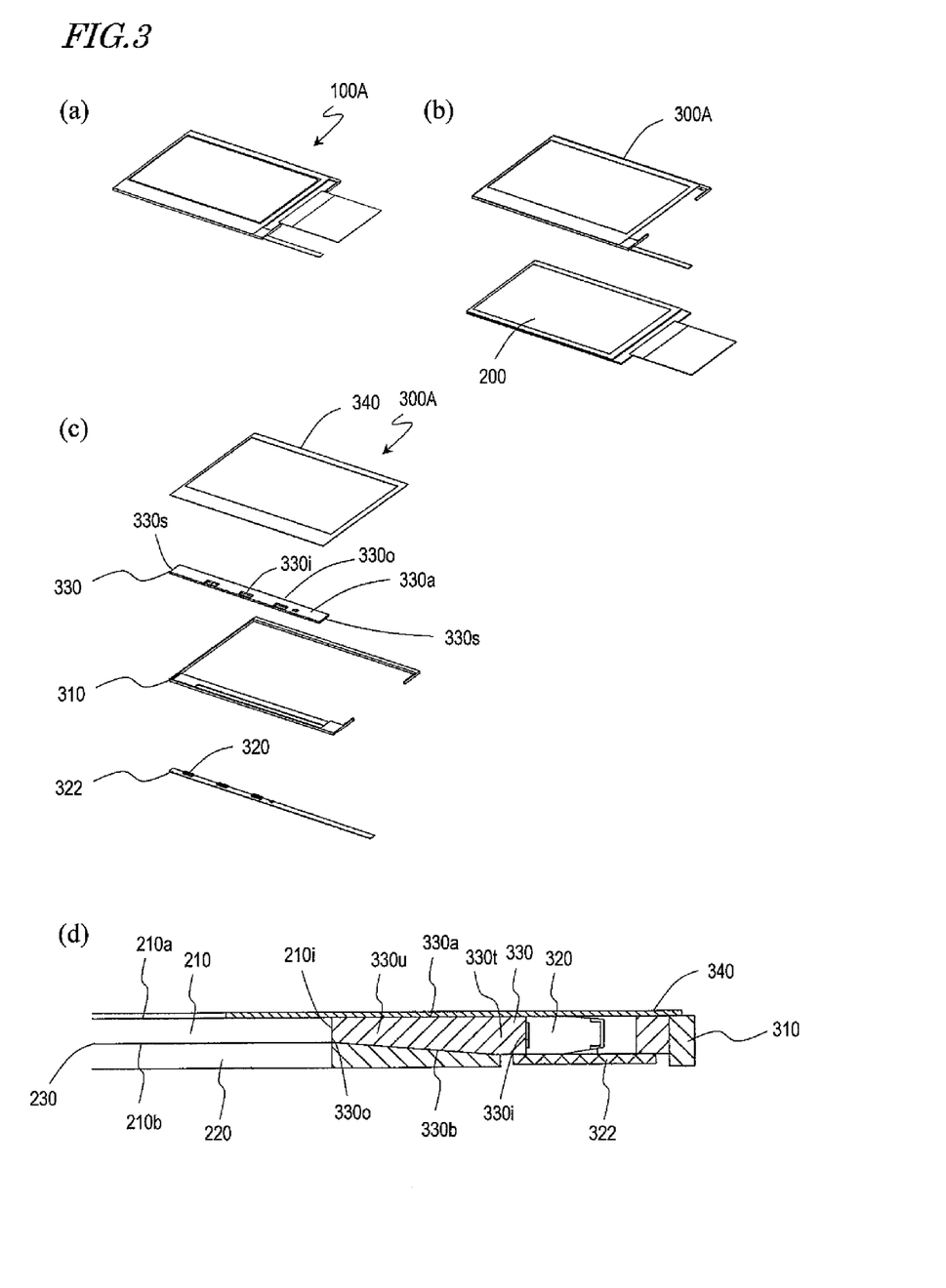

The transparent substrate 210 has a front face 210a, a rear face 210b, an incident face 210i, a terminal end face 210e, and side faces (not shown in FIG. 3). The front transparent substrate 210 has a rectangular solid shape, as does the rear transparent substrate 220. The front face 210a of the transparent substrate 210 is substantially coplanar with the front face 330a of the light guide plate 330, whereby the liquid crystal display device 100A is downsized.

The stabilization sheet 340 has a frame shape with an open center. In the sidelight unit 300A, the stabilization sheet 340 is attached onto the frame 310, the light sources 320, and the light guide plate 330, and by mounting the sidelight unit 300 to the liquid crystal panel 200, the light sources 320 of the sidelight unit 300 are disposed on a lateral side of the transparent substrate 210 of the liquid crystal panel 200 via the light guide plate 330, which allows the liquid crystal display device 100A to be thin. Through this mounting, the stabilization sheet 340 fixes the frame 310, the light sources 320, and the light guide plate 330 with the liquid crystal panel 200.

In the sidelight unit 300A, the stabilization sheet 340 has a light-shielding function, and the stabilization sheet 340 is also referred to as a light-shielding tape. For example, the light-shielding tape 340 is a tape with a thickness of 0.05 mm, whose base material is black PET.

In the liquid crystal display device 100A of the present embodiment, the light guide plate 330 is provided between the light sources 320 and the front transparent substrate 210, and the front face 330a of the light guide plate 330 is covered by the light-shielding tape 340. Thus, since the stabilization sheet 340 has a light-shielding function, further thinness is achieved.

The light guide plate 330 of the liquid crystal display device 100A of the present embodiment has a similar construction to that of the light guide plate 330A described above with reference to FIG. 2(a). In the liquid crystal display device 100A, the transparent substrate 210 is thinner than the light sources 320, but the incident faces 330i of the light guide plate 330 are thicker than the outgoing face 330o, so that light emitted from the light source 320 is effectively utilized. Moreover, since the transparent substrate 210 is thinner than the light sources 320, the liquid crystal display device 100A can be made thin. By ensuring that the front faces of the transparent substrate 210, the light source 320, and the light guide plate 330 are coplanar, a thin liquid crystal display device 100A with a flat surface can be realized. Furthermore, as described above, the light guide plate 330 suppresses unevenness in luminance and leakage light.

The liquid crystal display device 100A is produced as follows.

First, the frame 310, the FPC 322 having the light sources 320 provided thereon, the light guide plate 330, and the light-shielding tape 340 are provided. Next, the light guide plate 330 is mounted to the front face of the frame 310. When the light guide plate 330 is mounted to the frame 310, the rectangular apertures in the light guide plate 330 overlap with the aperture in the frame 310.

Next, the FPC 322 is mounted on the rear face of the frame 310. At this time, the LEDs 320 provided on the FPC 322 are positioned in the apertures of both of the frame 310 and the light guide plate 330.

Next, the light-shielding tape 340 is attached onto the frame 310, the light sources 320, and the light guide plate 330. The width of each side of the light-shielding tape 340 is set so that, after the attachment, a portion of each side of the light-shielding tape 340 extends into the open portion in the middle of the frame 310, beyond the frame 310. Thus, the sidelight unit 300A is produced.

Thereafter, the sidelight unit 300A is mounted to the liquid crystal panel 200. The light-shielding tape 340 becomes attached to the liquid crystal panel 200, whereby the liquid crystal panel 200, the frame 310, the light sources 320, and the light guide plate 330 are stabilized. In this manner, the liquid crystal display device 100A, in which the liquid crystal panel 200 and the sidelight unit 300A are integrated, is produced.

Embodiment 3

In the above description, the sidelight unit is mounted to the front face of the liquid crystal panel; however, the present invention is not limited thereto. The sidelight unit may be mounted to the rear face of the liquid crystal panel.

Figure 4:
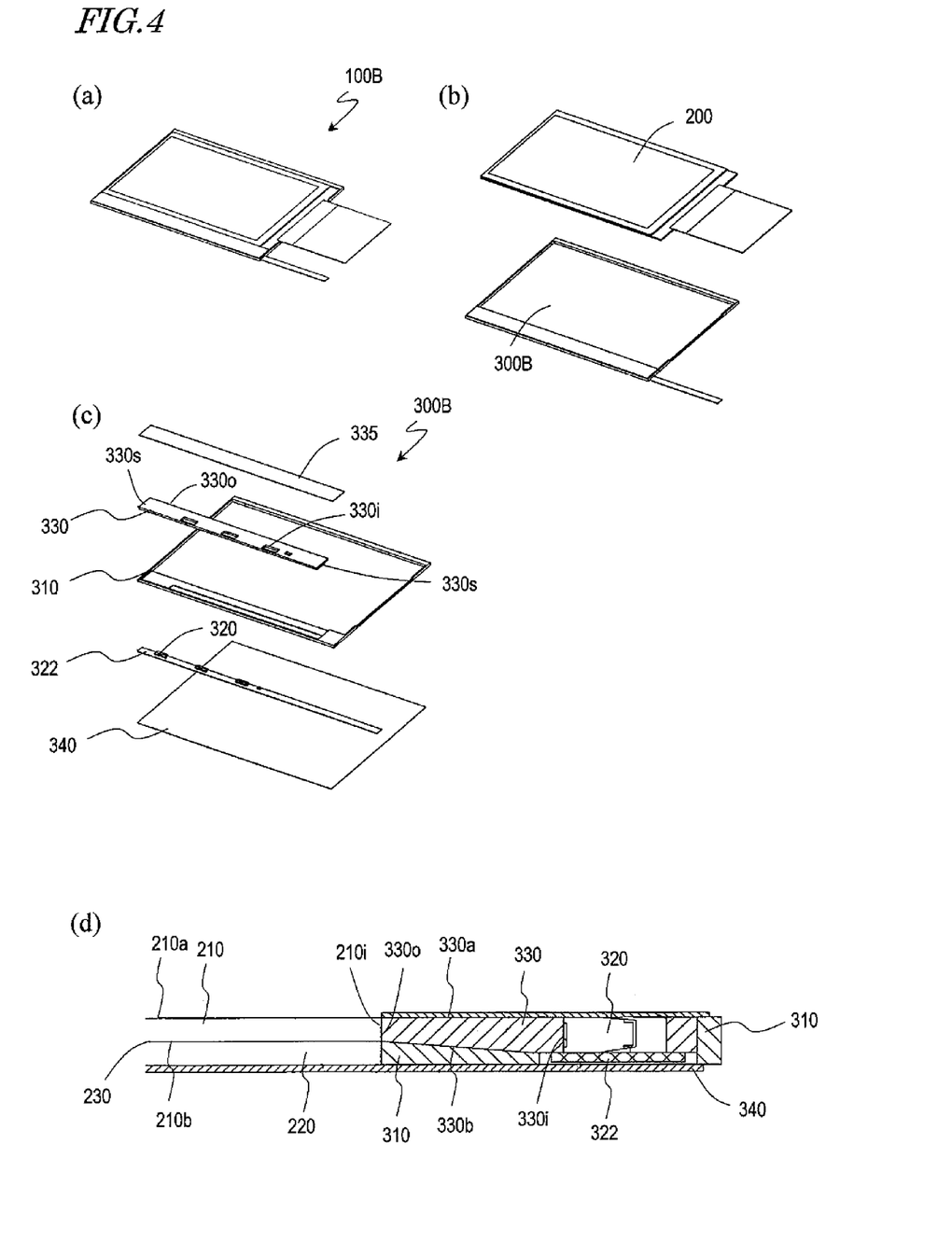

Hereinafter, with reference to FIG. 4, a third embodiment of the liquid crystal display device according to the present invention will be described. FIG. 4(a) shows a perspective view of a liquid crystal display device 100B of the present embodiment; FIG. 4(b) shows an exploded perspective view of the liquid crystal display device 100B; FIG. 4(c) shows an exploded perspective view of a sidelight unit 300B in the liquid crystal display device 100B; and FIG. 4(d) shows a schematic cross-sectional view of the liquid crystal display device 100B. For conciseness, any description similar to those of the liquid crystal display devices 100 and 100A above will be omitted.

The liquid crystal display device 100B includes a liquid crystal panel 200 and the sidelight unit 300B. In the liquid crystal display device 100B, the sidelight unit 300B is mounted to the rear face of the liquid crystal panel 200. In the liquid crystal display device 100B, too, light sources 320 and a light guide plate 330 of the sidelight unit 300B are disposed on a lateral side of a front transparent substrate 210 of the liquid crystal panel 200.

The sidelight unit 300B includes a frame 310, the light sources 320, the light guide plate 330, a light-shielding tape 335, and a stabilization sheet 340. The frame 310 has a frame shape with an open center, with a linear aperture being provided along one longer side thereof. The inner periphery of the frame 310 is designed in a size substantially corresponding to the liquid crystal panel 200. Due to the frame shape of the frame 310 of the sidelight unit 300B, a mechanical strength can be maintained and a decrease in workability can be suppressed.

LEDs are used as the light sources 320, which are provided on an FPC 322. The light guide plate 330 is a thin plate, with a plurality of apertures being provided along one longer side of the light guide plate 330. The size of the rectangular apertures in the light guide plate 330 is smaller than the size of the aperture in the frame 310. The apertures in the light guide plate 330 overlap with the aperture in the frame 310, and the LEDs 320 are provided so as to correspond to both apertures. A double-sided tape is attached to a face of the FPC 322 that comes in contact with the frame 310, such that the FPC 322 is kept in tight contact with the frame 310 by the double-sided tape.

The light-shielding tape 335 has a rectangular shape with substantially the same size as the light guide plate 330, and covers the light guide plate 330. The light-shielding tape 335 restrains any light other than the light emitted from the light sources 320 from entering the light guide plate 330. The light sources 320, the light guide plate 330, and the light-shielding tape 335 are mounted to the frame 310.

In the liquid crystal display device 100B, the stabilization sheet 340 has substantially the same size as the outer shape of the frame 310. The stabilization sheet 340 fixes the liquid crystal panel 200 and the frame 310. In the sidelight unit 300B, the stabilization sheet 340 is provided on the rear face (back face) of the sidelight unit 300B, and the stabilization sheet 340 is also referred to as a back sheet. The back sheet 340 is a white tape with a thickness of 0.085 mm, whose base material is PET, for example.

The liquid crystal display device 100B is produced as follows.

First, the frame 310, the FPC 322 having the light sources 320 provided thereon, the light guide plate 330, the light-shielding tape 335, and the stabilization sheet 340 are provided. Next, the light guide plate 330 is mounted to the front face of the frame 310. When the light guide plate 330 is mounted to the frame 310, the rectangular apertures in the light guide plate 330 overlap with the aperture in the frame 310.

Next, the FPC 322 is mounted to the rear face of the frame 310. At this time, the LEDs 320 provided on the FPC 322 are positioned in the aperture of the frame 310 and the apertures of the light guide plate 330.

Next, the light-shielding tape 335 is attached onto the frame 310, the light sources 320, and the light guide plate 330. Next, the stabilization sheet 340 is attached onto the rear face of the frame 310. Thus, the sidelight unit 300B is produced.

Thereafter, the sidelight unit 300B is mounted to the rear face of the liquid crystal panel 200. The stabilization sheet 340 becomes attached to the liquid crystal panel 200, whereby the liquid crystal panel 200 and the frame 310 are stabilized. In this manner, the liquid crystal display device 100B, in which the liquid crystal panel 200 and the sidelight unit 300B are integrated, is produced.

Embodiment 4

In the above description, the light emitted from the light source is input to the front transparent substrate via the light guide plate; however, the present invention is not limited thereto. The light emitted from the light source may be input to the rear transparent substrate via the light guide plate. In the above description, the liquid crystal panel is of the reflection mode, where a light-scattering type liquid crystal layer is used; however, the present invention is not limited thereto. The liquid crystal panel may be of the transmission mode.

Figure 5:
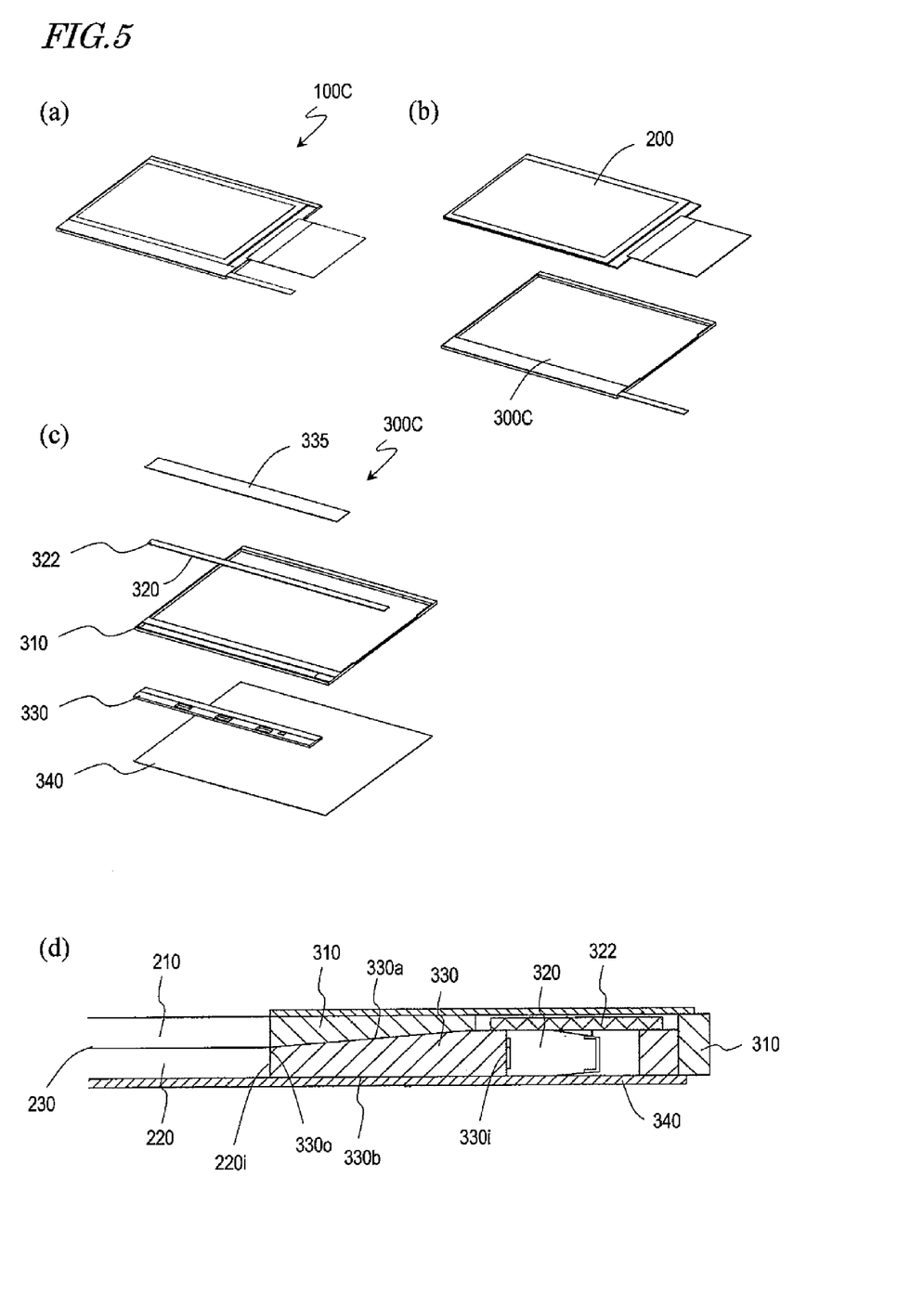

Hereinafter, with reference to FIG. 5, a fourth embodiment of the liquid crystal display device according to the present invention will be described. FIG. 5(a) shows a perspective view of a liquid crystal display device 100C of the present embodiment; FIG. 5(b) shows an exploded perspective view of the liquid crystal display device 100C; FIG. 5(c) shows an exploded perspective view of a sidelight unit 300C in the liquid crystal display device 100C; and FIG. 5(d) shows a schematic cross-sectional view of the liquid crystal display device 100C. For conciseness, any description similar to those of the liquid crystal display devices 100, 100A, and 100B above will be omitted.

The liquid crystal display device 100C includes a liquid crystal panel 200 and the sidelight unit 300C, which is mounted to the rear face of the liquid crystal panel 200. In the liquid crystal display device 100C of the present embodiment, the liquid crystal panel 200 is of the transmission mode. For example, the liquid crystal layer 230 is a vertical-alignment type, and polarizers not shown are provided on the outside of the transparent substrates 210 and 220.

The sidelight unit 300C includes a frame 310, light sources 320, a light guide plate 330, a stabilization sheet 340, and a light-shielding tape 335. The frame 310 has a frame shape with an open center, with a linear aperture being provided along one longer side thereof. The outermost peripheral portion of the frame 310 protrudes toward the rear face side. The inner periphery of the frame 310 is designed in a size substantially corresponding to the liquid crystal panel 200. The light sources 320 and the light guide plate 330 are mounted to the rear face of the frame 310.

LEDs which are provided on an FPC 322 are used as the light sources 320. The light guide plate 330 is a thin plate, with a plurality of apertures being provided along one of the longer sides of the light guide plate 330. The rectangular apertures in the light guide plate 330 are in a size corresponding to the light sources 320 provided on the FPC 322. The apertures in the light guide plate 330 overlap with the aperture in the frame 310, with the LEDs 320 being provided so as to correspond to both apertures.

The light-shielding tape 335 has a rectangular shape with substantially the same size as the FPC 322, and covers the FPC 322. The light-shielding tape 335 restrains any light other than the light emitted from the light sources 320 from entering the light guide plate 330. The light sources 320, the light guide plate 330, and the light-shielding tape 335 are mounted to the frame 310.

In the liquid crystal display device 100C, the stabilization sheet 340 has substantially the same size as the outer shape of the frame 310. The stabilization sheet 340 fixes the liquid crystal panel 200, the frame 310, the light sources 320, and the light guide plate 330.

The sidelight unit 300C is mounted to the rear face of the liquid crystal panel 200. Through this mounting, the light sources 320 of the sidelight unit 300C are disposed on a lateral side of the rear transparent substrate 220 of the liquid crystal panel 200 via the light guide plate 330. Light emitted from the light sources 320 enters the transparent substrate 220 of the liquid crystal panel 200 via the light guide plate 330, and the liquid crystal panel 200 performs displaying by utilizing this light. Thus, in the liquid crystal display device 100C, light emitted from the light sources 320 of the sidelight unit 300C enters the rear transparent substrate 220 of the liquid crystal panel 200 via the light guide plate 330. As such, the sidelight unit 300C may also be referred to as a back-sidelight unit.

In the liquid crystal display device 100C, the stabilization sheet 340 has a reflection function. Within the light which is emitted from the light sources 320 and enters the transparent substrate 220 of the liquid crystal panel 210, the light which is transmitted through the front face 220a of the transparent substrate 220 is modulated by the liquid crystal layer 230. On the other hand, the light which is transmitted through the rear face 220b of the transparent substrate 220 is reflected in the upper direction by the stabilization sheet 340 having a reflection function. Therefore, the stabilization sheet 340 is also referred to as a reflection sheet. The reflection sheet 340 is a silver sheet whose base material is PET.

The liquid crystal display device 100C is produced as follows.

First, the frame 310, the FPC 322 having the light sources 320 provided thereon, the light guide plate 330, the light-shielding tape 335, and the reflection sheet 340 are provided. Next, the light guide plate 330 is mounted to the rear face of the frame 310. When the light guide plate 330 is mounted to the frame 310, the rectangular apertures of the light guide plate 330 are positioned in the aperture of the frame 310.

Next, the FPC 322 is mounted to the front face of the frame 310. At this time, the LEDs 320 provided on the rear face of the FPC 322 are positioned in the apertures of both of the frame 310 and the light guide plate 330.

Next, the light-shielding tape 335 is mounted to the frame 310, the light sources 320, and the light guide plate 330. Next, the reflection sheet 340 is attached onto the rear face of the frame 310. Thus, the sidelight unit 300C is produced.

Thereafter, the sidelight unit 300C is mounted to the rear face of the liquid crystal panel 200. The reflection sheet 340 becomes attached to the liquid crystal panel 200, whereby the liquid crystal panel 200, the frame 310, the light sources 320, and the light guide plate 330 are stabilized. In this manner, the liquid crystal display device 100C, in which liquid crystal panel 200 and the sidelight unit 300C are integrated, is produced.

Although the liquid crystal panel 200 in the liquid crystal display device 100C is of the transmission mode, the present invention is not limited thereto. The liquid crystal panel 200 may be of the transflective mode.

In the above-described liquid crystal display device 100C, the sidelight unit 300C is mounted to the rear face of the liquid crystal panel 200; however, the present invention is not limited thereto. The sidelight unit may be mounted to the front face of the liquid crystal panel.

In the above description, the stabilization sheet 340 is provided in the sidelight units 300, 300A, 300B, and 300C of the liquid crystal display devices 100, 100A, 100B, and 100C, such that the stabilization sheet 340 fixes the frame 310 and the liquid crystal panel 200; however, the present invention is not limited thereto. Fixing of the frame 310 and the liquid crystal panel 200 may be achieved by an adhesive or the like.

For reference sake, the disclosure of Japanese Patent Application No. 2009-29131, on which the present application claims priority, is incorporated herein by reference.

INDUSTRIAL APPLICABILITY

A liquid crystal display device according to the present invention is suitably used for a mobile phone or the like.

REFERENCE SIGNS LIST

100 liquid crystal display device
200 liquid crystal panel
300 sidelight unit
310 frame
320 light source
330 light guide plate
340 stabilization sheet

The invention claimed is:

1. A liquid crystal display device comprising:
   a liquid crystal panel having a front transparent substrate, a rear transparent substrate, and a liquid crystal layer provided between the front transparent substrate and the rear transparent substrate;
   a sidelight unit mounted to the liquid crystal panel, the sidelight unit including a light source provided on a lateral side of the liquid crystal panel and a light guide plate provided between the liquid crystal panel and the light source; and
   a frame to which the light source and the light guide plate are mounted; wherein
   an aperture is provided in each of the light guide plate and the frame;
   the light guide plate is mounted to one of a front face and a rear face of the frame so that the aperture of the light guide plate and the aperture of the frame overlap; and
   the flexible printed circuit is mounted to the other of the front face and rear face of the frame so that the light source is positioned in the aperture of the light guide plate and in the aperture of the frame.

2. The liquid crystal display device of claim 1, wherein the sidelight unit further includes the frame.

3. The liquid crystal display device of claim 1, wherein the sidelight unit further has a stabilization sheet for at least fixing the frame and the liquid crystal panel.

4. The liquid crystal display device of claim 1, wherein light emitted from the light source enters the front transparent substrate via the light guide plate.

5. The liquid crystal display device of claim 1, wherein the liquid crystal layer is a light-scattering type.

6. The liquid crystal display device of claim 3, wherein the stabilization sheet has a light-shielding function.

7. The liquid crystal display device of claim 6, wherein the stabilization sheet is attached onto a portion of a front face of the liquid crystal panel and covers the light source and the light guide plate.

8. The liquid crystal display device of claim 1, wherein the sidelight unit further includes a light-shielding sheet covering the light source and the light guide plate.

9. The liquid crystal display device of claim 3, wherein the stabilization sheet is attached to a rear face of the liquid crystal panel.

10. The liquid crystal display device of claim 1, wherein light emitted from the light source enters the rear transparent substrate via the light guide plate.

11. The liquid crystal display device of claim 3, wherein the stabilization sheet has a reflection function.

12. The liquid crystal display device of claim 1, wherein the sidelight unit further includes a flexible printed circuit having the light source provided thereon.

13. The liquid crystal display device of claim 1, wherein the light guide plate lowers directivity of light emitted from the light source.

14. The liquid crystal display device of claim 1, wherein the light guide plate has a front face, a rear face, an incident face opposing the light source, and an outgoing face opposing the one transparent substrate.

15. The liquid crystal display device of claim 14, wherein the incident face of the light guide plate is thicker than the outgoing face.

16. The liquid crystal display device of claim 14, wherein the incident face of the light guide plate has a bump-dent structure provided at a position corresponding to the light source.

17. A liquid crystal display device, comprising:
   a liquid crystal panel having a front transparent substrate, a rear transparent substrate, and a liquid crystal layer provided between the front transparent substrate and the rear transparent substrate;
   a sidelight unit mounted to the liquid crystal panel, the sidelight unit including a light source provided on a lateral side of the liquid crystal panel and a light guide plate provided between the liquid crystal panel and the light source; and
   a frame to which the light source and the light guide plate are mounted; wherein
   the light guide plate has a front face, a rear face, an incident face opposing the light source, and an outgoing face opposing the one transparent substrate; and
   a throughhole or a hole is provided in at least one of the front face and the rear face of the light guide plate.

18. The liquid crystal display device of claim 14, wherein the outgoing face of the light guide plate has a bump-dent structure.

19. The liquid crystal display device of claim 14, wherein at least one of the front face and the rear face of the light guide plate has a bump-dent structure.

20. The liquid crystal display device of claim 14, wherein,
the front face of the light guide plate is substantially parallel to a peak direction of light emitted from the light source; and
the rear face of the light guide plate is inclined with respect to the front face.

* * * * *